(12) United States Patent
Lang

(10) Patent No.: US 6,489,691 B1
(45) Date of Patent: Dec. 3, 2002

(54) WIND POWER GENERATION SYSTEM

(76) Inventor: Tsay Ying Lang, 8F, No. 30-2, Denggung Road, Danshuei Jen, Taipei Hsien (TW)

( * ) Notice: Subject to any disclaimer, the term of this patent is extended or adjusted under 35 U.S.C. 154(b) by 25 days.

(21) Appl. No.: 09/853,783

(22) Filed: May 14, 2001

(51) Int. Cl.[7] ................................................. F03D 9/00
(52) U.S. Cl. ............................ 290/44; 290/55; 416/117
(58) Field of Search ............................. 290/43, 44, 54, 290/55; 416/117, 132 B

(56) References Cited

U.S. PATENT DOCUMENTS

| | | | | |
|---|---|---|---|---|
| 3,730,643 A | * | 5/1973 | Davison | 290/55 |
| 4,073,516 A | * | 2/1978 | Kling | 244/33 |
| 4,350,895 A | * | 9/1982 | Cook | 290/55 |
| 4,491,739 A | * | 1/1985 | Watson | 290/44 |
| 4,589,344 A | * | 5/1986 | Davison | 104/118 |
| 4,684,817 A | * | 8/1987 | Goldwater | 290/55 |
| 5,134,305 A | * | 7/1992 | Senehi | 290/55 |
| 5,734,202 A | * | 3/1998 | Shuler | 290/1 R |
| 5,758,911 A | * | 6/1998 | Gerhardt | 104/24 |
| 5,977,649 A | * | 11/1999 | Dahill | 290/44 |
| 5,992,341 A | * | 11/1999 | Gerhardt | 114/102.16 |

FOREIGN PATENT DOCUMENTS

DE  43 00 789 A1 * 10/1993 ............. F03D/5/04

* cited by examiner

Primary Examiner—Nicholas Ponomarenko
(74) Attorney, Agent, or Firm—Michael D. Bednarek; Shaw Pittman LLP

(57) ABSTRACT

A wind power generation system mainly includes a wind catching mechanism slidably mounted on a guide rail mechanism. The wind catching mechanism includes a wind-catching means that is selectively oriented to face wind blowing against it, so as to cause the entire wind catching mechanism to slides along the guide rail mechanism before the wind and pulls a linking cable connected to a dynamo, so that the dynamo is actuated to generate power.

16 Claims, 6 Drawing Sheets

WIND POWER GENERATION SYSTEM

BACKGROUND OF THE INVENTION

The present invention relates to a wind power generation system, and more particularly to a wind power generation system that is environmentally friendly and could be economically constructed to efficiently transmit kinetic energy of wind to actuate a high-power dynamo to generate power.

With the quick development in technologies and the quick changes in our living environment, electric power has become prerequisite to our life. Electric power has decisive influence on industrial and economic developments and is a very important index to the modernization of a country. In view of the deep reliance of human beings on the electric power, as well as the quickly increased power consumption, it necessitates all countries in the world to widely propagate the important concept of energy saving and to exploit new source of power to keep necessary economic and industrial progresses.

There are various types of power generation systems known in the art. In the case of a power generation plant that is addressed to high-power outputs in an economical mode, steam turbines are typically used to actuate power generators. Currently, sources of heat for producing steams needed by the steam turbines include coal, nuclear energy, etc. In the case of heat power generation, there are different types of fuels, such as coal, oil, gas, etc. In either case, waste gases and carbon dioxide are produced to pollute our living environment. Particularly, the carbon dioxide results in the worldwide temperature increase to largely affect the climate of the earth, forming an important issue in many highly developed countries. In the case of nuclear power generation, it is strongly repulsed by environment-protection people due to the problems of radiation of nuclear waste.

Another type of power generation that should also be mentioned is the hydroelectric power generation. In this type of power generation, water head is utilized to impact blades of water turbines to actuate power generators. That is why water turbines are usually mounted at an outlet of a dam. The advantage of hydroelectric power generation is low environmental pollution and is therefore environmentally friendly.

However, cost for hardware of hydroelectric power generation is extremely high and surprisingly high volume of water would be consumed. Since it is uneasy to find locations that are suitable for construction of power stations, hydroelectric power generation has never been widely developed. And, although the hydroelectric power generation is environmentally friendly, the construction of a dam would inevitably have influences on the ecologies of the surrounding areas.

There are also other sources of energy, such as solar energy and tide power. Such sources of energy are typically employed only in small-power generation due to limited locations suitable for providing such energies and incomplete development in related hardware.

In the case of wind power generation, windmill is a common device used to actuate a dynamo to transform wind force into electric power. However, as a limitation in structure, the windmill usually has blades of small wind areas and therefore has low dynamic transfer efficiency and low power generation capacity. Normally, highlands or widely open lands are locations that would supply sufficient wind force for wind power generation. However, the common windmill is suitable for setting up only on wide and open ground that is not easily found on the densely populated earth now. In view that wind force is indeed a rich resource of power generation, it should be well utilized to solve the problems concerning power generation we currently encounter with.

SUMMARY OF THE INVENTION

It is therefore a primary object of the present invention to provide a wind power generation system that has simple structure and high wind catching efficiency to achieve power generation in an economical and environmentally friendly manner.

Another object of the present invention is to provide a wind power generation system that has simple structure and is therefore particularly suitable for mounting at distant locations providing rich wind force.

A further object of the present invention is to provide a wind power generation system that includes a wind catching mechanism that is easily adjustable in response to different wind directions in different seasons to stably work all the year round.

To achieve the above and other objects, the wind power generation system of the present invention mainly includes a wind catching mechanism slidably mounted on a guide rail mechanism. The wind catching mechanism includes a wind-catching means that is selectively oriented to face wind blowing against it to enable the entire wind catching mechanism to slides along the guide rail mechanism before the wind and pulls a linking cable connected to a dynamo, so that the dynamo is actuated to generate power.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
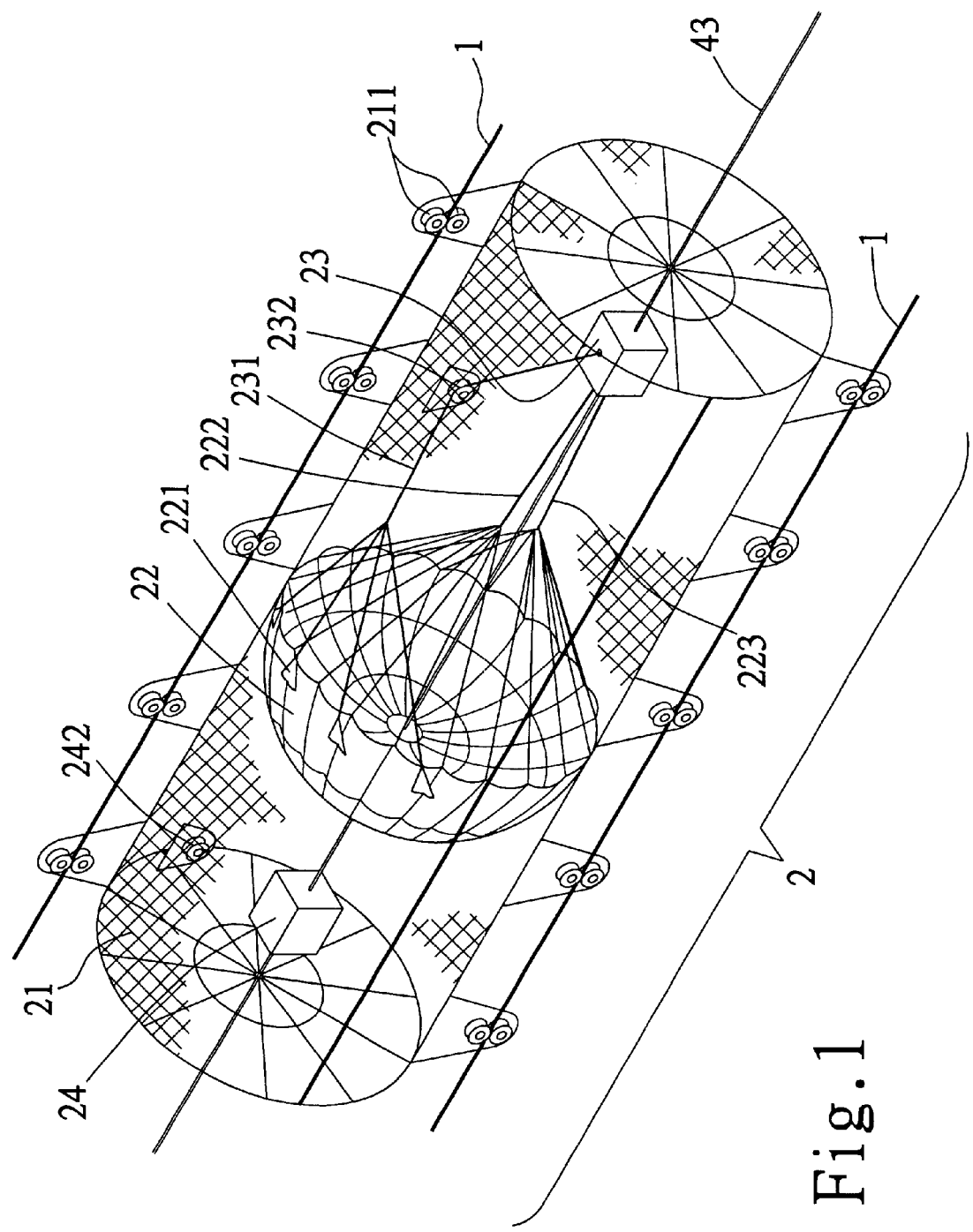
FIG. 1 is a perspective view of a preferred embodiment of a wind catching mechanism and a guide rail mechanism included in a wind power generation system according to the present invention.

Please refer to FIG. 1 that is a perspective view of a first preferred embodiment of a guide rail mechanism 1 and a wind catching mechanism 2 included in a wind power generation system according to the present invention.

The guide rail mechanism 1 mainly includes a plurality of extended members, such as steel cables, ropes, steel rails, etc., for mounting at locations with rich resource of wind force, for example, between two mountain peaks, between two high-rise buildings, or on a wide and open highland or ground.

Figure 2:
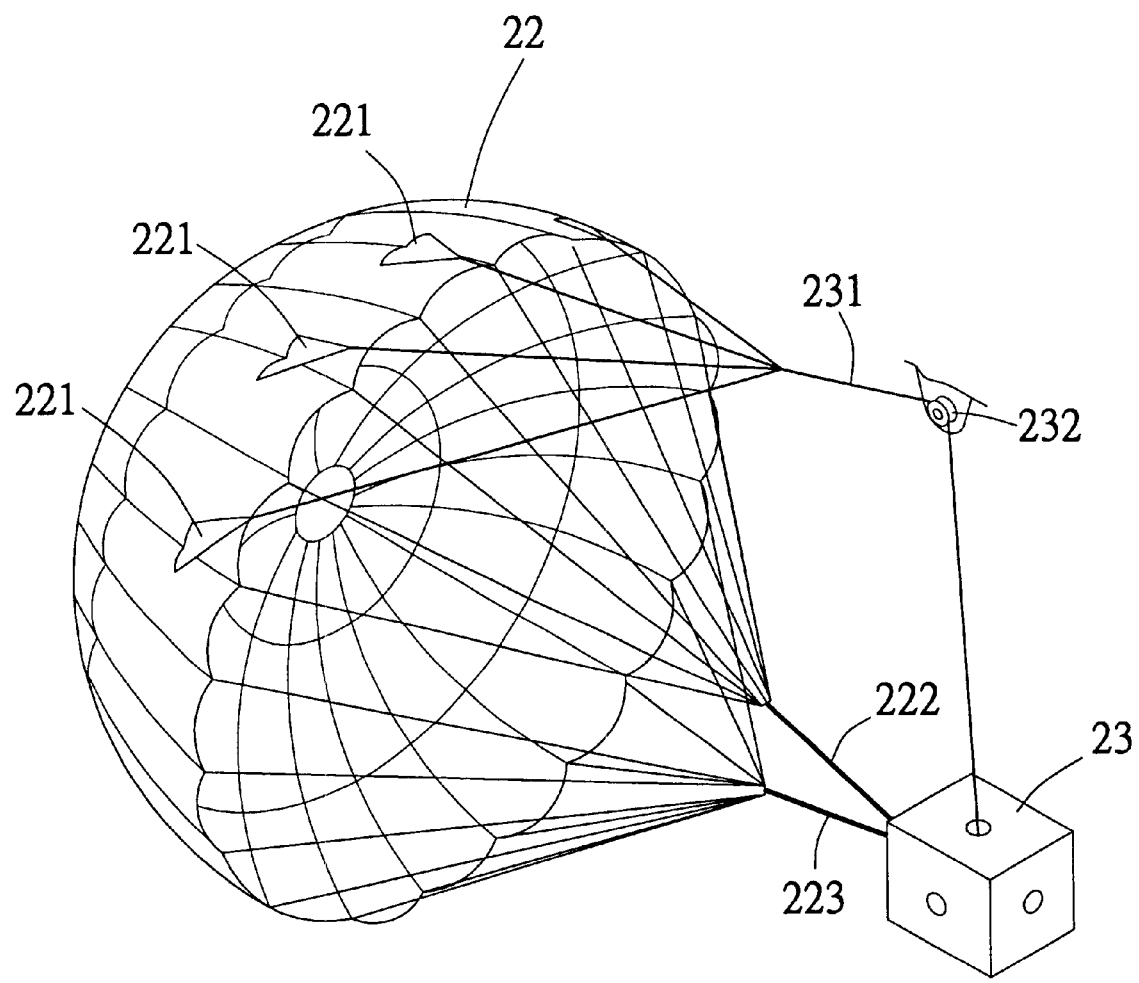
FIG. 2 is a perspective view of a wind-catching means included in the wind catching mechanism of the present invention.

The wind catching mechanism 2 mainly includes an external cage 21, a wind-catching means 22 that is in 15 the form of a canopy in the illustrated embodiment, and at least a first winder 23. The cage 21 defines a hollow inner space and is highly ventilative. A plurality of pulley blocks 211 are provided at outer sides of the cage 21 to sequentially mount along the extended members of the guide rail mechanism 1, so that the cage 21 is slidable on a path defined by the guide rail mechanism 1. Please refer to FIG. 2. The wind-catching means 22 is a substantially semispherical canopy made of a tough and flexible material to provide good wind catching ability. A plurality of locating areas 221, that is, the triangular patches as can be seen in FIG. 2, are provided on the canopy 22 along an upper half of a peripheral area thereof. Each locating area 221 has a control line 231 extended therefrom. The control lines 231 are converged at a predetermined point and pulled to pass a fixed pulley 232 before being connected the first winder 23. The fixed pulley 232 is fixedly mounted to an inner wall surface of the cage 21 close to a top thereof. A plurality of suspension lines are extended from points on the canopy 22 spaced along a peripheral edge thereof. The suspension lines extended from an upper half of the peripheral edge of the canopy 22 are converged at a predetermined point into a first main cord 222 and the suspension lines extended from a lower half of the peripheral edge of the canopy 22 are converged at a predetermined point into a second main cord 223. Both the first and the second main cords 222, 223 are then extended into the first winder 23. A linking cable 43 is connected to the cage 21, such that the linking cable 43 moves along with the cage 21 when the latter slides along the guide rail mechanism 1.

By orienting the canopy 22 against the wind to catch wind, the cage 21 is caused to slide before the wind along the extended members of the guide rail mechanism 1. To eliminate or to reduce a wind force applied on the canopy 22, the first and the second main cords 222, 223 are manipulated through the first winder 23 in a predetermined manner. For example, by pulling the first main cord 222 into the first winder 23 while releasing the second main cord 223 from the first winder 23, an upper half of the canopy 22 is caused to collapse toward the a lower half thereof, making the canopy 22 horizontally stretch over a bottom of the cage 21 without the ability of catching wind. When the first and the second main cords 222, 223 are manipulated, the control cord 231 is pulled into or released from the first winder 23 at the same time, so that the upper half of the canopy 22 could be more quickly collapsed or restored to an expanded state. For example, when the control cord 231 is wound into the winder 23 when the first main cord 222 is pulled into the winder 23, the locating areas 221 on the canopy 22 are pulled by the control cord 231 to accelerate the pulling and the releasing of the first and the second main cords, respectively.

A second winder 24 structurally identical to the first winder 23 is provided on the cage 21 at one side of the canopy 22 opposite to the first winder 23. Another fixed pulley 242 is also mounted on the inner wall surface of the cage 21 close to the top thereof corresponding to the second winder 24. It is possible to extend the first and the second main cords 222, 223 and the control cord 231 into the first winder 23 or the second winder 24 in different seasons depending on an actual wind direction. Thus, the wind-catching means 22, that is, the canopy 22, could be easily adjusted in its operating direction in response to different wind directions and could therefore be fully utilized all the year round.

Figure 3:
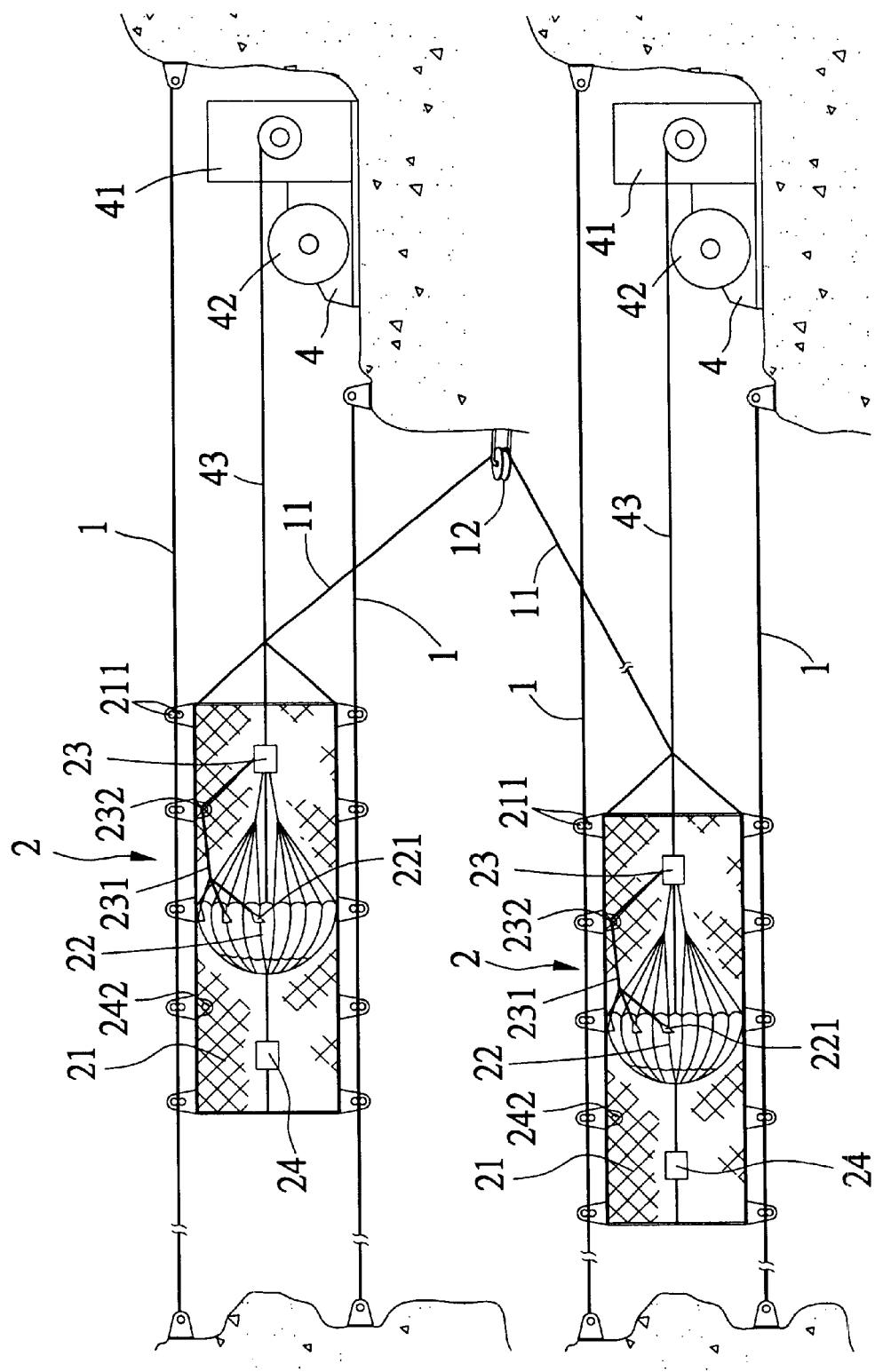
FIG. 3 illustrates two sets of wind catching mechanism of he present invention are used at the same time to achieve wind power generation.

It is possible to use multiple sets of wind catching mechanism 2 to drive multiple sets of wind-driven dynamos. FIG. 3 illustrates two sets of the wind catching mechanism 2 of the present invention are used at the same time to drive two sets of wind-driven dynamos 4. In this case, two sets of guide rail mechanisms 1 are separately mounted at desired places to support the two sets of wind catching mechanism 2. A fixed pulley 12 is mounted at a selected position, so that a connecting cable 11 passes there to connect at two ends to the cages 21 of the two wind catching mechanisms 2. It is to be noted that the two ends of the connecting cable 11 are separately connected to the end of the cages 2 that faces against the wind. Each linking cable 43 extended from the cage 21 is connected to a transmission gear box 41 that drives a dynamo 4 and a flywheel 42 at the same time, wherein the flywheel 42 may be any other means capable of maintaining a stable momentum.

When one of the two wind-catching means 22 of the two sets of wind catching mechanisms 2 is subjected to wind blowing against it such that the cage 21 slides along the guide rail mechanism 1 before the wind, the linking cable 43 thereof and the connecting cable 11 are pulled by the cage 21. At this point, the transmission gear box 41 connected to one end of the linking cable 43 is driven by the linking cable 43 to change speed properly and therefore drives the dynamo 4 to generate power. The flywheel 42 functions to smoothen the operation of the transmission gear box 41. Meanwhile, the connecting cable 11 pulls the other cage 21 connected to another end thereof to slide along the other guide rail mechanism 1 against the wind. To reduce a wind resistance to the second set of wind catching mechanism 2, the wind-catching means thereof, that is, the canopy 22, is collapsed in a manner as described above. By alternately expanding and collapsing the two canopies 22, the two sets of wind catching mechanism 2 separately slide along the two guide rail mechanisms 1 reciprocatingly, driving the two dynamos 4 to generate power continuously.

Figure 4:
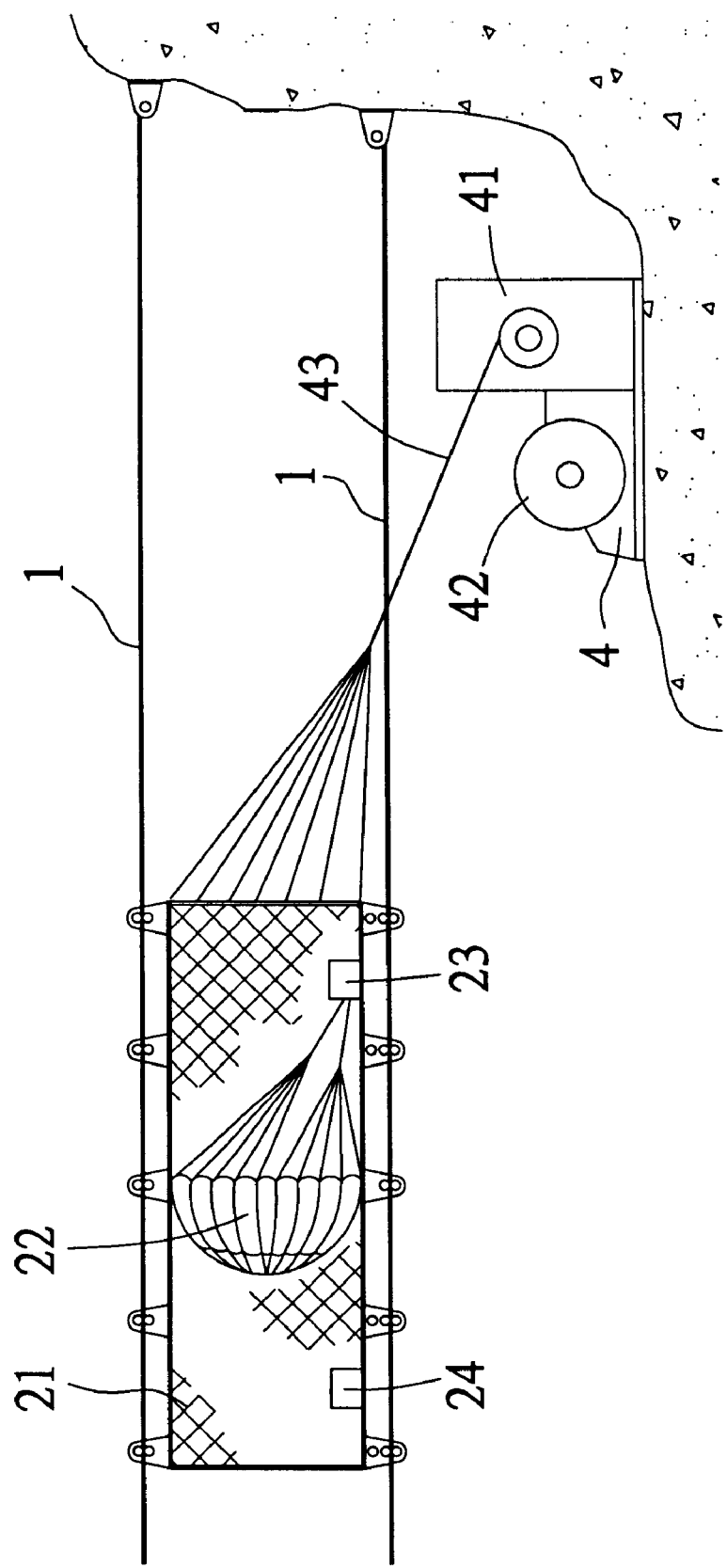
FIG. 4 illustrates only one set of wind catching mechanism of the present invention is used to achieve wind power generation.

It is also possible to use only set of wind catching mechanism 2 of the present invention to achieve the purpose of wind power generation, as shown in FIG. 4. In this case, the guide rail mechanism 1 is mounted at a selected position to support the wind catching mechanism 2. The linking cable 43 is extended from an end of the cage 21 against the wind to a transmission gear box 41 that in turn drives a dynamo 4 and a flywheel 42 at the same time. As in the case of using two sets of wind catching mechanism 2, the flywheel 42 in this case may also be any other means capable of maintaining a stable momentum.

When the canopy 22 of the wind catching mechanism 2 is subjected to a wind blowing against it, the cage 21 is caused to slide along the guide rail mechanism 1 before the wind and pull the linking cable 43. At this point, the linking cable 43 drives the transmission gear box 41 to change speed properly and thereby drives the dynamo 4 to generate power. And when the cage 21 slides to a distal end of a travel defined by the guide rail mechanism 1, the flywheel 42 is in a state having the maximum kinetic energy. At this point, the first winder 23 is actuated to collapse the canopy 22 in the manner as described above to reduce the wind resistance to the wind-catching means 22, and the transmission gear box 41 is properly caused to operate in reverse direction for the flywheel 42 to pull the linking cable 43 through an inertia force of the flywheel 42, so that the cage 21 is pulled to slide along the guide rail mechanism 1 to its home position on the guide rail mechanism 1. By repeating the above procedures, the cage 21 is caused to reciprocatingly slide on the guide rail mechanism 1 to drive the dynamo 4 to generate power. In the event the flywheel 42 has a volume too small to provide sufficient inertia force to pull the cage 21 back, an additional power supply system may be provided to one side of the dynamo 4 or the transmission gear box 41 to provide power needed to pull back the cage 21.

Figure 5:
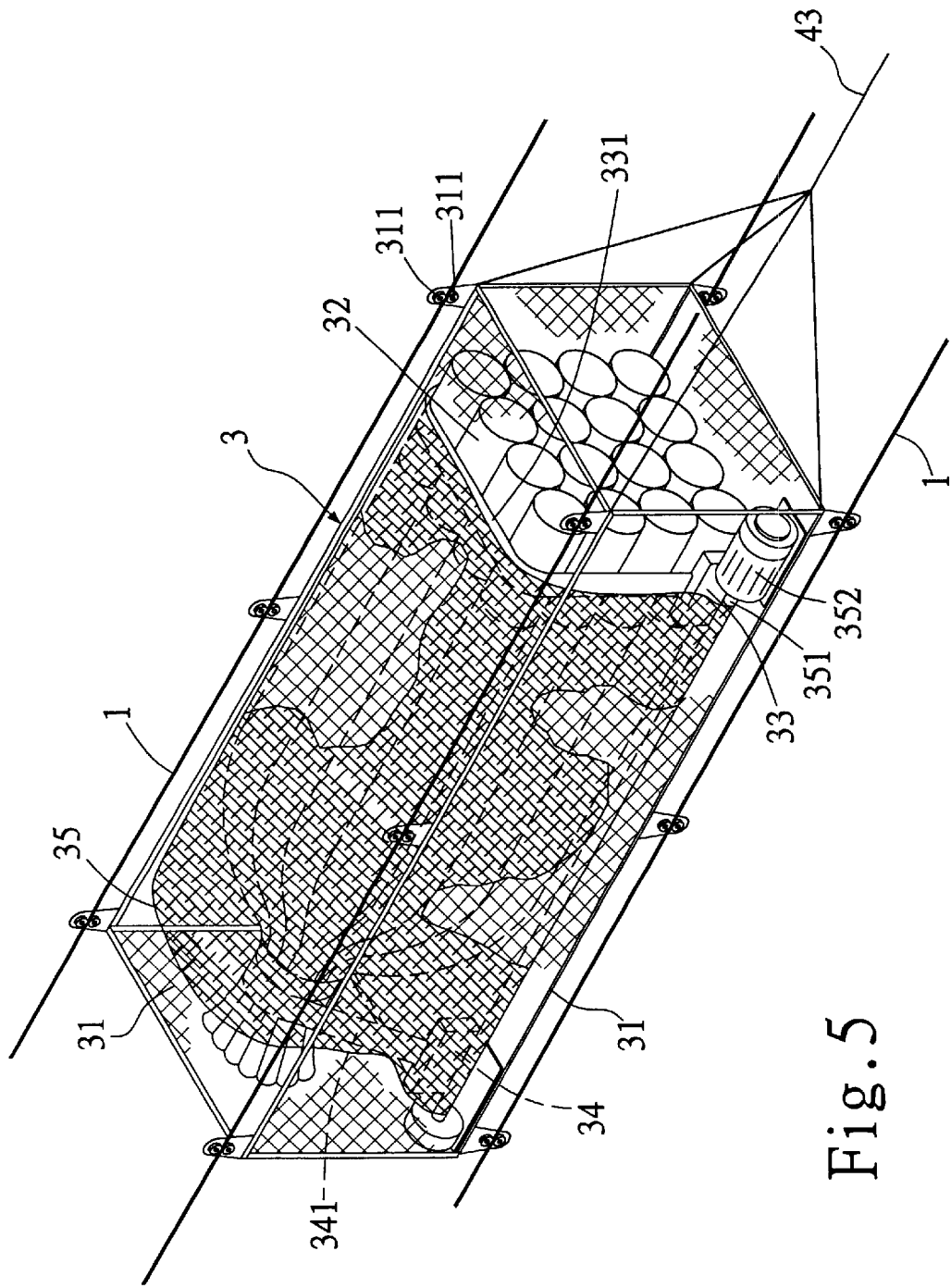
FIG. 5 is a perspective view of another preferred embodiment of the wind catching mechanism according to the present invention.
Figure 6:
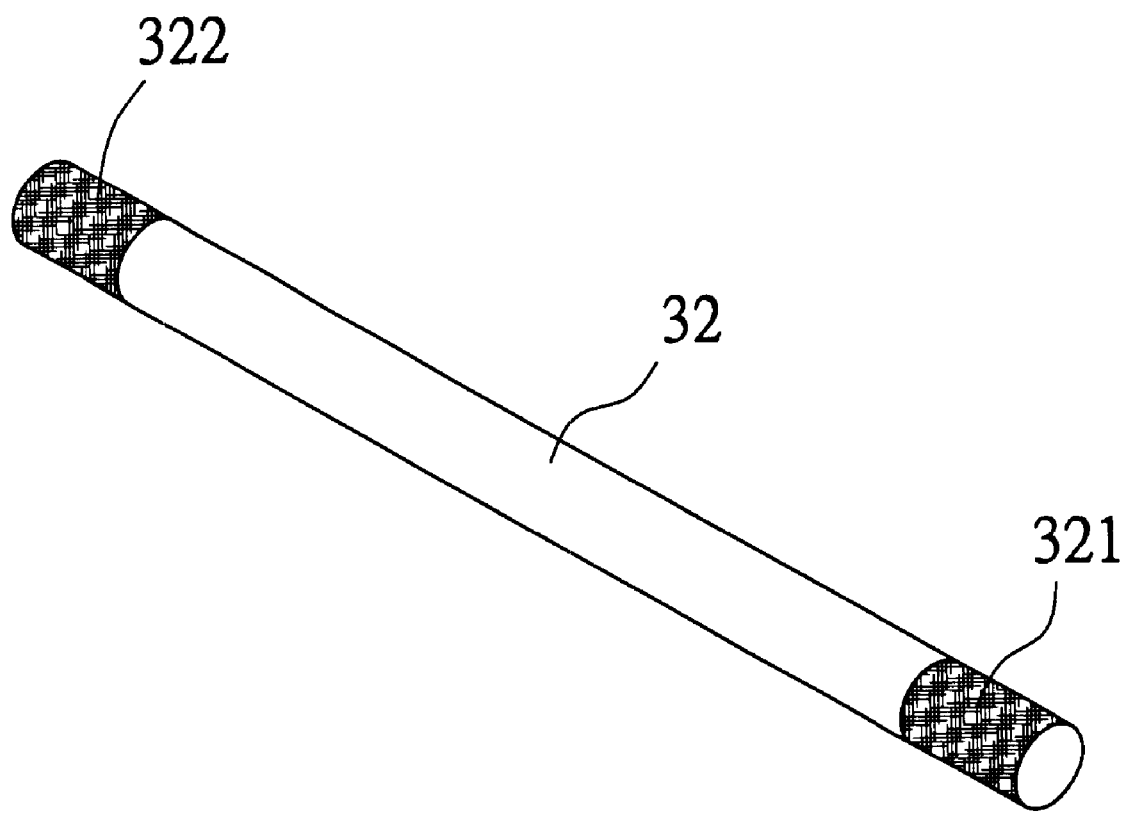
FIG. 6 is a perspective view of a wind-catching tube included in the wind catching mechanism of FIG. 5.

FIG. 5 shows another preferred embodiment of the wind catching mechanism of the present invention. In this embodiment, the wind catching mechanism 3 includes a cage 31 having a plurality of pulley blocks 311 provided at outer sides thereof for the cage to slide along the guide rail mechanism 1. At least one wind-catching tube 32 is axially provided in the cage 31. Please refer to FIG. 6. Each wind-catching tube 32 has two elastically expandable end portions 321, 322. Two fastening belts 331, 341 are provided in the cage 31 to adjustably enclose the end portions 321 and 322, respectively. The fastening belts 331, 341 are controlled through belt controllers 33, 34 to either loosely enclose the end portions 321, 322 or respectively tightly bind the end portions 321, 322 together. By actuating one of the two belt controllers, say, the belt controller 34, to pull the fastening belt 341 and thereby tightly binds the end portions 322 of all wind-catching tubes 32 together, the other end portions 321 of the wind-catching tubes 32 are in an open state to allow the wind-catching tubes 32 to catch wind blowing against the end portions 321. When the belt controller 34 is actuated to release the fastening belt 341, the end portions 322 are released and automatically restore to their original shape, so that the wind-catching tubes 32 are completely opened for wind to pass therethrough without producing any wind resistance.

For the wind-catching tubes 32 to be bound at either end portion completely depending on actual need in order to minimize wind resistance, a binding net 35 having a predetermined width is provided around a middle portion of the wind-catching tubes 32. The binding net 35 is connected at an axial edge to a shaft 351 that is rotatably connected to a power source 352, such as a motor. When the motor 352 is started, it rotates the shaft 351 to cause the binding net 35 to be wound around the shaft 351. In this manner, the wound binding net 35 properly compresses and squeezes the middle portion of the wind-catching tubes 32 to expel air that might remain in the tubes 32 to expand the same.

The wind power generation system of the present invention is able to efficiently transmit kinetic energy and is environmentally friendly and industrially valuable.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A wind power generation system, comprising:
    at least one set of guide rail mechanism for defining a fixed sliding path; and
    at least one set of wind catching mechanism, each of which being slidably mounted on said guide rail mechanism and including a wind-catching means for catching wind blowing against it to thereby cause said entire wind catching mechanism to slide before the wind along said fixed sliding path defined by said guide rail mechanism;
    wherein each said wind catching mechanism is connected to a linking cable that is connected at another end to a dynamo mounted at a predetermined location, and said wind catching mechanism sliding before the wind pulls said linking cable for the latter to actuate said dynamo to generate power.

2. The wind power generation system as claimed in claim 1, wherein each said guide rail mechanism comprises a plurality of cables.

3. The wind power generation system as claimed in claim 1, wherein each said guide rail mechanism comprises a plurality of rails.

4. The wind power generation system as claimed in claim 1, wherein each said wind catching mechanism further comprises a cage housing and moving along with said wind-catching means; said cage being provided at outer sides with a plurality of pulley blocks for mounting on said guide rail mechanism, so that said cage is slidably supported on said guide rail mechanism.

5. The wind power generation system as claimed in claim 1, wherein said wind-catching means is a substantially semispherical canopy.

6. The wind power generation system as claimed in claim 5, wherein said canopy is made of a tough and flexible material and is provided along a peripheral edge with a plurality of lines extended therefrom, said lines being converged at a predetermined point into at least one cord that is then connected to a first winder, whereby by manipulating said first winder, said at least one cord is either pulled into or released from said first winder to control an expanding state of said canopy and accordingly regulates a wind-catching ability of said canopy.

7. The wind power generation system as claimed in claim 6, wherein each said wind catching mechanism includes a second winder structurally identical to said first winder, said second winder being provided at another side of said canopy opposite to said first winder, such that said control lines could be connected to either said first or said second winder depending on a wind direction.

8. The wind power generation system as claimed in claim 6, wherein said canopy is provided along the peripheral edge with a plurality of suspension lines extended therefrom, said suspension lines extended from a first half of said peripheral edge of said canopy being converged at a predetermined point into a first main cord and said suspension lines extended from a second half of said peripheral edge of said canopy being converged at a predetermined point into a second main cord, both said first and said second main cords being connected to said first or said second winder, whereby by manipulating said first or said second winder, said first and said second main cords are separately caused to wind into or released from said winder to control an expansion or collapse of said canopy.

9. The wind power generation system as claimed in claim 6, wherein said canopy is provided along an upper half of a peripheral area with a plurality of locating areas from each of which a control line extends, said control lines being converged at a predetermined point into a control cord that is then guided through a fixed pulley mounted on said cage before being connected to said first or said second winder to assist in controlling the expansion or collapse of said canopy.

10. The wind power generation system as claimed in claim 9, wherein said locating areas are patches sewed onto said canopy at said upper half of said peripheral area.

11. The wind power generation system as claimed in claim 1, wherein said wind-catching means of said wind catching mechanism includes at least one wind-catching tube, one of two ends of which is selectively bound up.

12. The wind power generation system as claimed in claim 11, further comprises a binding net having a predetermined width, said binding net being provided around a middle portion of said at least one wind-catching tube and having an axial edge connected to a shaft that is driven to rotate by a power source, whereby when said power source rotates said shaft, said binding net is wound around said shaft to compress and squeeze said middle portion of said at least one wind-catching tube.

13. The wind power generation system as claimed in claim 12, wherein said power source is a motor.

14. The wind power generation system as claimed in claim 11, wherein each said wind-catching tube includes two elastically expandable end portions, and wherein each said wind catching mechanism includes two fastening belts that are controlled through belt controllers to either loosely enclose or tightly bind said elastic end portions of said at least one wind-catching tube, and said elastic end portions of each said wind-catching tube being automatically expandable to an original shape when said fastening belts are loosened.

15. The wind power generation system as claimed in claim 14, further comprises a binding net having a predetermined width, said binding net being provided around a middle portion of said at least one wind-catching tube and having an axial edge connected to a shaft that is driven to rotate by a power source, whereby when said power source rotates said shaft, said binding net is wound around said shaft to compress and squeeze said middle portion of said at least one wind-catching tube.

16. The wind power generation system as claimed in claim 15, wherein said power source is a motor.

* * * * *